(12) United States Patent
Takano

(10) Patent No.: US 12,528,536 B2
(45) Date of Patent: Jan. 20, 2026

(54) VEHICLE

(71) Applicant: Isuzu Motors Limited, Yokohama (JP)

(72) Inventor: Shuichi Takano, Fujisawa (JP)

(73) Assignee: Isuzu Motors Limited, Yokohama (JP)

( * ) Notice: Subject to any disclaimer, the term of this patent is extended or adjusted under 35 U.S.C. 154(b) by 179 days.

(21) Appl. No.: 18/124,595

(22) Filed: Mar. 22, 2023

(65) Prior Publication Data

US 2023/0322294 A1 Oct. 12, 2023

(30) Foreign Application Priority Data

Mar. 24, 2022 (JP) ................... 2022-048946

(51) Int. Cl.
*B62D 5/04* (2006.01)
*B62D 15/02* (2006.01)
*G01L 5/22* (2006.01)

(52) U.S. Cl.
CPC ......... *B62D 5/0463* (2013.01); *B62D 15/021* (2013.01); *G01L 5/221* (2013.01)

(58) Field of Classification Search
CPC .. B62D 5/0463; B62D 15/021; B62D 15/024; B62D 15/0245; B62D 15/025; B62D 6/002; G01L 5/221
See application file for complete search history.

(56) References Cited

U.S. PATENT DOCUMENTS

| | | | |
|---|---|---|---|
| 2016/0362128 A1 | 12/2016 | Sugawara et al. | |
| 2018/0201317 A1 | 7/2018 | Kudo et al. | |
| 2022/0017144 A1* | 1/2022 | Miyake | B62D 15/0245 |
| 2022/0227416 A1* | 7/2022 | Suzuki | B62D 15/025 |

FOREIGN PATENT DOCUMENTS

| | | |
|---|---|---|
| CN | 106068219 | 11/2016 |
| CN | 108454694 | 8/2018 |
| CN | 113942564 | 1/2022 |
| JP | 06-171531 | 6/1994 |
| JP | 2003-030793 | 1/2003 |
| JP | 2020-111215 | 7/2020 |

* cited by examiner

*Primary Examiner* — Lindsay M Low
*Assistant Examiner* — Ruben Picon-Feliciano

(57) ABSTRACT

A steering control apparatus and a vehicle capable of accurately obtaining a steering angle with which the vehicle will travel straight are provided. The steering control apparatus includes a steering actuator control section that controls a steering actuator for changing the steering angle such that the steering angle achieves a target steering angle, a storage section that stores threshold steering angle information regarding a threshold steering angle, which is a steering angle with which steering torque becomes a certain threshold when the target steering angle is varied cyclically and continuously, and a calculation section that obtains a neutral point of the steering angle based on the threshold steering angle information.

3 Claims, 5 Drawing Sheets

VEHICLE

CROSS REFERENCE TO RELATED APPLICATIONS

This application claims the benefit of priority of Japanese Patent Application No. 2022-048946, filed on Mar. 24, 2022, the contents of which are incorporated by reference as if fully set forth herein in their entirety.

TECHNICAL FIELD

The present disclosure relates to a steering control apparatus and a vehicle that perform calculation processing relating to a steering angle.

BACKGROUND ART

Lane-following driving control techniques for controlling a steering actuator provided for a steering mechanism such that a vehicle drives while following a lane in accordance with a control instruction based on a surrounding condition of the vehicle are known. Japanese Patent Application Laid-Open No. 2003-30793, for example, discloses one of such techniques.

SUMMARY OF INVENTION

Technical Problem

In the conventional lane-following driving control technique disclosed in Japanese Patent Application Laid-Open No. 2003-30793, steering torque applied by a steering actuator to a steering mechanism is determined on the basis of a value of a steering angle detected by a steering angle sensor, a value of vehicle speed detected by a vehicle speed sensor, information regarding a lane detected by a camera or another apparatus, and the like. If the value of the steering angle detected by the steering sensor is zero at this time, a control unit of the steering actuator determines the steering torque on an assumption that motion in a yaw direction is not caused in a vehicle and the vehicle will travel straight.

In practice, however, an actual steering angle might deviate from the value of the steering angle detected by the steering sensor, and the vehicle might not travel straight even when the detected value of the steering angle is zero. In this case, it is difficult for the vehicle to drive while following a lane.

Given these circumstances, the present disclosure aims to provide a steering control apparatus and a vehicle capable of accurately obtaining a steering angle with which the vehicle will travel straight.

Solution to Problem

A steering control apparatus according to one aspect of the present disclosure includes: a steering actuator control section that controls a steering actuator for changing a steering angle such that the steering angle achieves a target steering angle; a storage section that stores threshold steering angle information regarding a threshold steering angle, the threshold steering angle being a steering angle with which steering torque becomes a certain threshold when the target steering angle is varied cyclically and continuously; and a calculation section that obtains a neutral point of the steering angle based on the threshold steering angle information.

A vehicle according to one aspect of the present disclosure is a vehicle including the steering control apparatus described above and the steering actuator, the vehicle including: a detection section that detects a change in loading weight of the vehicle, in which, in a case where a change in the loading weight of the vehicle is detected, the steering control apparatus automatically calculates the neutral point while the vehicle is stationary.

Advantageous Effects of Invention

According to the present disclosure, a steering control apparatus and a vehicle capable of accurately obtaining a steering angle with which the vehicle will travel straight are provided.

DESCRIPTION OF EMBODIMENTS

An embodiment of the present disclosure will be described in detail hereinafter with reference to the drawings. Detailed description of well-known matters, redundant description of substantially the same components, and the like, however, might be omitted.

<Configuration of Vehicle>

Figure 1:
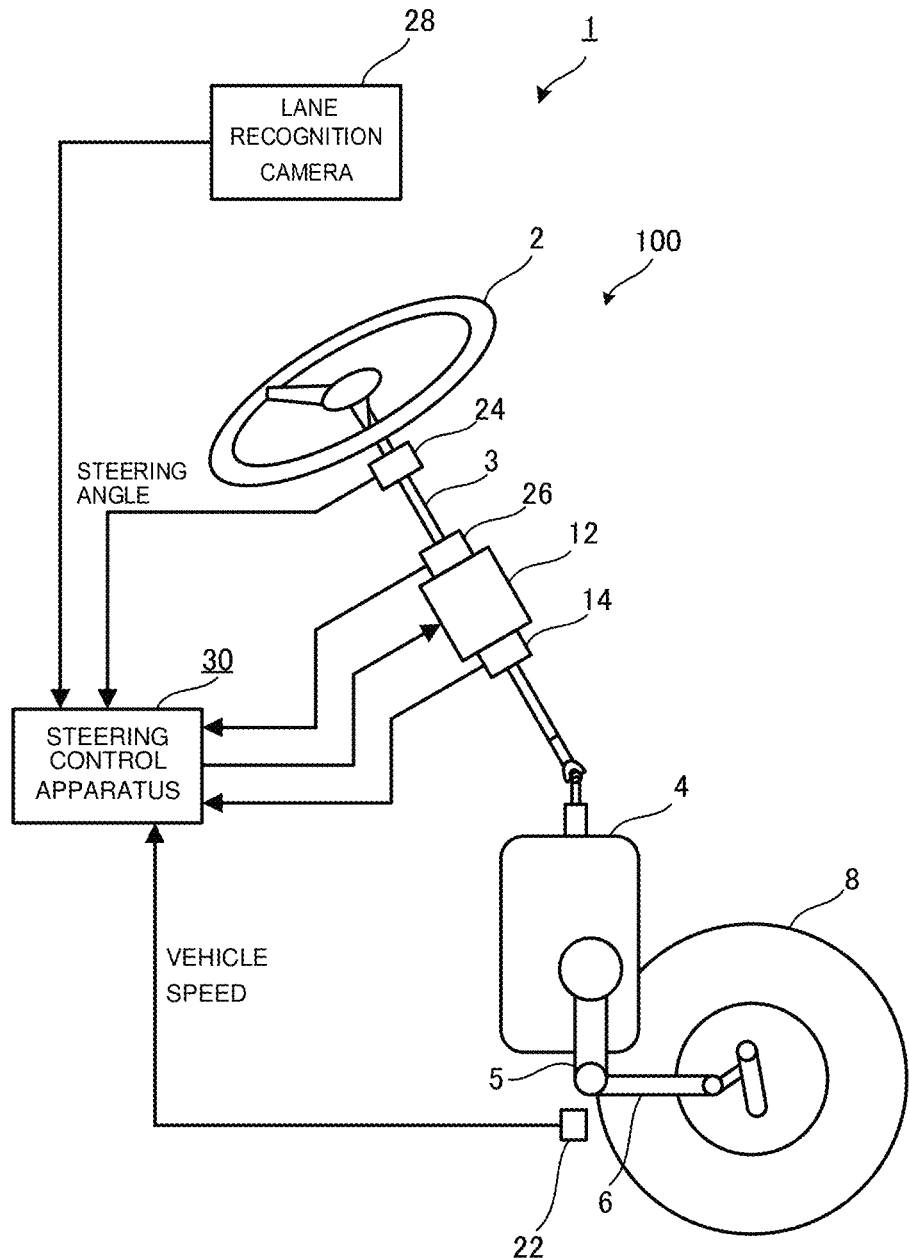
FIG. 1 is a diagram schematically illustrating the configuration of a vehicle including a steering control system.

FIG. 1 is a diagram schematically illustrating the configuration of vehicle 1 including steering control system 100 according to the embodiment of the present disclosure.

Vehicle 1 includes steering wheel 2, steering shaft 3, hydraulic unit 4, pitman arm 5, link mechanism 6, steered wheel 8, and steering control system 100.

Steering wheel 2 is connected to hydraulic unit 4 through steering shaft 3 provided inside a steering column (not illustrated). Hydraulic unit 4 includes a cylinder (not illustrated) to which hydraulic oil pressurized by a hydraulic pump (not illustrated) is supplied, a piston (not illustrated) that moves linearly under pressure of the hydraulic oil, and a sector shaft (not illustrated) that converts the linear motion of the piston into rotational motion and that transfers the rotational motion to pitman arm 5.

Pitman arm 5 is connected to steered wheel 8 through link mechanism 6 and the like. As a result, when a driver of vehicle 1 turns steering wheel 2, for example, steering torque is transferred to hydraulic unit 4 via steering shaft 3, and assist torque is applied by hydraulic pressure. Total torque of the steering torque and the assist torque causes pitman arm 5 to swing, and steered wheel 8 is steered via link mechanism 6 and the like.

Steering control system 100, on the other hand, steers steered wheel 8 independently of operations performed by the driver. Steering control system 100 includes steering actuator 12, magnetic position sensor 14, vehicle speed sensor 22, steering angle sensor 24, steering torque sensor 26, lane recognition camera 28, and steering control apparatus 30.

Steering actuator 12 is provided for the steering column. Steering actuator 12 rotates as power is supplied from a battery (not illustrated) as a power supply, and transmits the rotation to steering shaft 3. Steering actuator 12 is, for example, a three-phase brushless motor (electric motor) including a rotor and a stator. A magnet (not illustrated) is fixed on the rotor.

Magnetic position sensor 14 includes a plurality of hall-effect integrated circuits (ICs) for detecting a rotational position of the rotor (magnet) of steering actuator 12. The plurality of hall-effect ICs are arranged at certain intervals in a circumferential direction of the rotor. Magnetic position sensor 14 outputs a result of the detection to an obtaining section (not illustrated) of steering control apparatus 30.

Vehicle speed sensor 22 detects speed of vehicle 1. Vehicle speed sensor 22 outputs a result of the detection to the obtaining section of steering control apparatus 30.

Steering angle sensor 24 outputs a signal based on a steering angle of steering wheel 2. The output signal of steering angle sensor 24 indicates an actual steering angle of steering wheel 2 and is output to the obtaining section of steering control apparatus 30.

Steering torque sensor 26 outputs a signal based on the steering torque applied to steering shaft 3. The output signal of steering torque sensor 26 is output to the obtaining section of steering control apparatus 30.

Lane recognition camera 28 is mounted on vehicle 1 and captures images around vehicle 1. Lane recognition camera 28 processes captured images to recognize a lane (a driving lane of vehicle 1) while vehicle 1 is driving and lanes adjacent to vehicle 1. Lane recognition camera 28 outputs a result of the recognition to the obtaining section of steering control apparatus 30.

Steering control apparatus 30 includes an electronic control unit (ECU). The ECU is an electronic control circuit including, as a main component, a microcomputer including a central processing unit (CPU), a read-only memory (ROM), and a random-access memory (RAM), which is used as a work memory. The CPU achieves various functions by executing programs stored in the ROM.

<Functional Configuration of Steering Control Apparatus 30>

Figure 2:
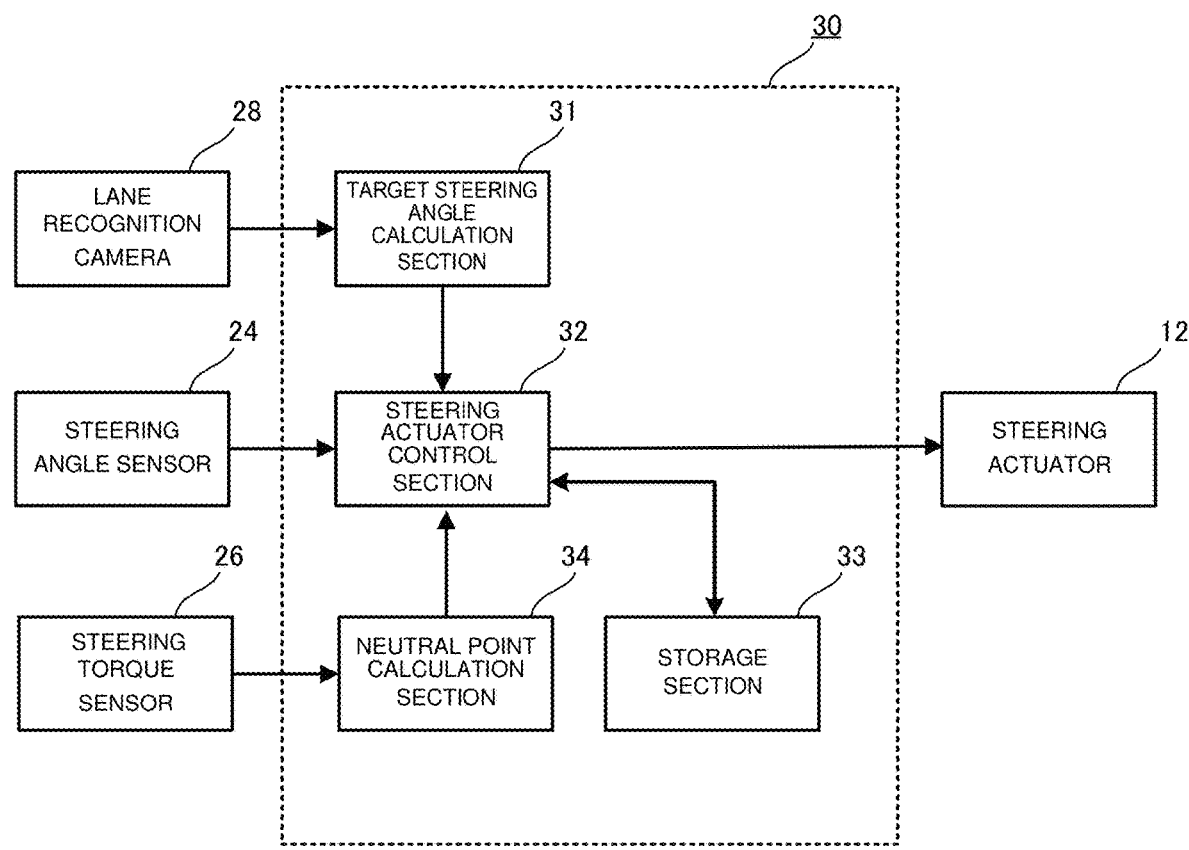
FIG. 2 is a functional block diagram of a steering control apparatus.

Functional blocks of steering control apparatus 30 will be described with reference to FIG. 2. As illustrated in FIG. 2, steering control apparatus 30 includes target steering angle calculation section 31, steering actuator control section 32, storage section 33, and neutral point calculation section 34.

With this configuration, steering control apparatus 30 performs at least two types of control, namely following driving control for causing, while vehicle 1 is driving on a road, vehicle 1 to perform following driving, where vehicle 1 follows a lane, and calculation control for calculating, while vehicle 1 is stationary, an actual neutral point and a range of play of the steering angle, which are parameters used in the following driving control.

During the following driving control, target steering angle calculation section 31 calculates, as necessary, a target steering angle used by vehicle 1 to follow a lane on the basis of a result of recognition (a driving lane, other vehicles driving in the vicinity, obstacles, etc.) performed by lane recognition camera 28. The present disclosure does not particularly limit a method for calculating a target steering angle used by target steering angle calculation section 31, and any known technique may be used as necessary.

Steering actuator control section 32 outputs a control signal for controlling steering actuator 12 such that the steering angle achieves the target steering angle.

Storage section 33 stores various parameters during the calculation control for calculating the actual neutral point and the range of play of the steering angle.

Neutral point calculation section 34 calculates the actual neutral point and the range of play of the steering angle during the calculation control.

<Example of Operation of Steering Control Apparatus 30>

An example of an operation of steering control apparatus 30 having the above configuration will be described hereinafter. Steering control apparatus 30 performs at least two operations, namely a following driving operation for, while vehicle 1 is driving on a road, automatically following a lane and calculation operations for, while vehicle 1 is stationary, calculating the actual neutral point and the range of play of the steering angle. The following driving operation is an operation based on the above-described following driving control, and the calculation operations are operations based on the above-described calculation control.

[Following Driving Operation]

Figure 3:
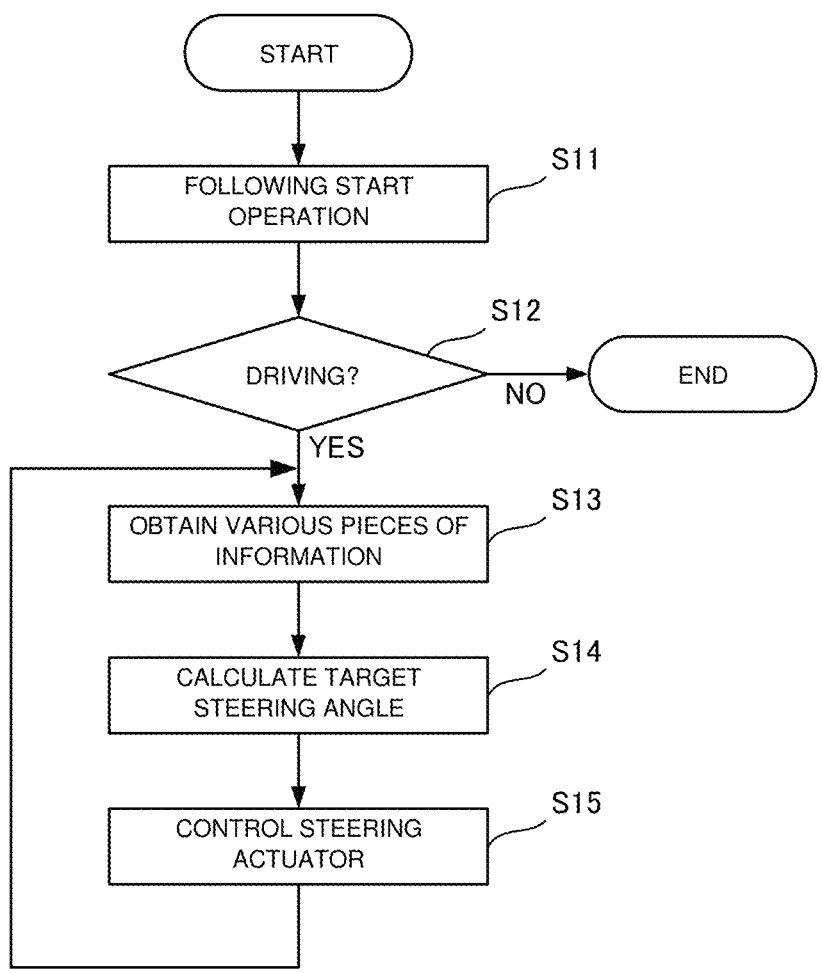
FIG. 3 is a flowchart illustrating an example of a following driving operation performed by the steering control apparatus.

First, an example of the following driving operation will be described. FIG. 3 is a flowchart illustrating an example of the following driving operation performed by steering control apparatus 30.

In step S11, steering control apparatus 30 receives, for example, a starting operation, which is performed by the driver to start the following driving operation. The starting operation is performed by the driver using, for example, an operation section, such as a switch, a button, or a touch panel, provided at a position operable from a driver's seat of vehicle 1. The start operation may be a remote operation performed from the outside of vehicle 1.

In step S12, steering control apparatus 30 checks whether vehicle 1 is driving. If vehicle 1 is driving, the process proceeds to step S13, and if vehicle 1 is not driving, the following driving operation ends.

In step S13, steering control apparatus 30 obtains information necessary for the following driving control (vehicle speed, a position of a lane, positions of other vehicles driving in the vicinity and obstacles, etc.) from vehicle speed sensor 22, lane recognition camera 28, and the like.

In step S14, steering control apparatus 30 calculates a target steering angle on the basis of the information obtained in step S13.

In step S15, steering control apparatus 30 controls steering actuator 12 such that the steering angle achieves the target steering angle. At this time, steering control apparatus 30 may correct, using the neutral point of the steering angle calculated in the calculation operations, which will be described later, the steering angle so that the steering angle accurately achieves the target steering angle. The process then returns to step S13.

By repeating steps S13 to S15 until the following driving ends, steering control apparatus 30 can cause vehicle 1 to drive while following a lane. The following driving may end, for example, when an operation for ending the following driving performed by the driver is received or when the driver needs to drive themself due to an increased risk of a collision with an obstacle.

[Calculation Operations]

Next, an example of the calculation operations will be described. In the calculation operations, neutral point calculation section 34 of steering control apparatus 30 calculates the actual neutral point and the range of play of the steering angle.

Before describing a detailed example of the operation, a procedure of the whole operation will be described. In the calculation operations, first, steering control apparatus 30 outputs, to steering actuator 12, a control signal in which the target steering angle is changed cyclically and continuously. Changing the target steering angle cyclically and continuously specifically means that the target steering angle is changed along a sine wave, a triangle wave, a ramp wave (sawtooth wave), or the like.

Figure 4:
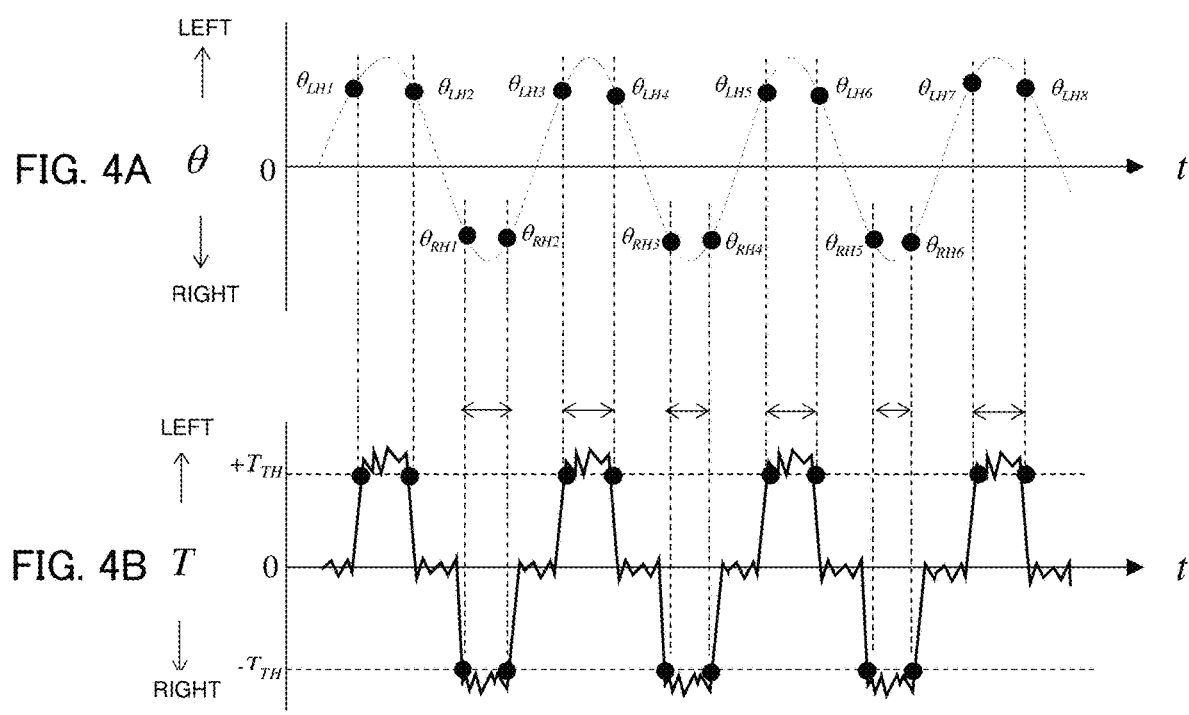
FIGS. 4A and 4B are diagrams illustrating calculation operations.

FIGS. 4A and 4B are diagrams illustrating the calculation operations. FIG. 4A is a diagram illustrating changes in the steering angle, which is changed by steering actuator 12, at a time when the target steering angle is changed along a sine wave as an example. In FIG. 4A, a vertical axis represents steering angle θ, and a horizontal axis represents time t. In FIG. 4A, positive and negative directions of the vertical axis correspond to left and right directions of the steering angle, respectively. That is, FIG. 4A illustrates a situation where steering actuator 12 turns, under control of steering control apparatus 30, steering wheel 2 in the left direction to an end and then turns steering wheel 2 in the right direction to an end via a neutral point a plurality of times (a plurality of cycles).

FIG. 4B is a diagram illustrating changes in the steering torque corresponding to the changes in the steering angle illustrated in FIG. 4A. In FIG. 4B, a vertical axis represents steering torque T, and the horizontal axis represents time t. Positive and negative directions of the vertical axis correspond to leftward and rightward steering torque, respectively.

Since the range of play is set for steering wheel 2 in vehicle 1, when the steering angle is changed cyclically and continuously as in FIG. 4A, the steering torque takes a value close to zero until an absolute value of the steering angle exceeds a certain value, and then sharply increases when the absolute value of the steering angle takes the certain value as illustrated in FIG. 4B. The steering torque remains substantially constant after the sharp increase, and then sharply decreases when the absolute value of the steering angle falls below the certain value. The range of play of steering wheel 2 refers to a range within which steered wheel 8 is not steered even if steering wheel 2 is turned. The sharp increase in the absolute value of the steering torque means that transfer of torque for steering steered wheel 8 has begun as steering wheel 2 gets out of the range of play. The sharp decrease in the absolute value of the steering torque means that transfer of torque for steering steered wheel 8 has ended as steering wheel 2 enters the range of play.

In FIG. 4B, the absolute value after the steering torque sharply changes is shown as threshold $T_{TH}$. In general, the range of play of steering wheel 2 slightly varies every time depending on how steering shaft 3, pitman arm 5, link mechanism 6, and the like are engaged with one another. For this reason, the steering angle with which the absolute value of the steering torque becomes threshold $T_{TH}$ is slightly different depending on a cycle of change in the target steering angle. In the present disclosure, the steering angle with which the absolute value of the steering torque becomes threshold $T_{TH}$ will be referred to as a threshold steering angle. Steering control apparatus 30 obtains the threshold steering angle with which the absolute value of the steering torque becomes threshold $T_{TH}$ for a plurality of cycles and averages the obtained threshold steering angles to determine the range of play of steering wheel 2.

FIG. 4A illustrates steering angles $\theta_{LH1}$, $\theta_{LH2}$, $\theta_{LH3}$, $\theta_{LH4}$, $\theta_{LH5}$, $\theta_{LH6}$, $\theta_{LH7}$, and $\theta_{LH8}$ with which the steering torque becomes threshold $T_{TH}$ in the left direction of the steering angle. FIG. 4A also illustrates steering angles $\theta_{RH1}$, $\theta_{RH2}$, $\theta_{RH3}$, $\theta_{RH4}$, $\theta_{RH5}$, and $\theta_{RH6}$ with which the steering torque becomes threshold $T_{TH}$ in the right direction of the steering angle.

In this case, steering control apparatus 30 calculates a play boundary value in each of the left and right directions of the steering angle by obtaining an average for a plurality of cycles as in following equations 1 and 2.

$$\theta_{LH\_AVG} = \frac{1}{n}\sum_{i=1}^{n}\theta_{LHi} \quad (1)$$

$$\theta_{RH\_AVG} = \frac{1}{n}\sum_{i=1}^{n}\theta_{RHi} \quad (2)$$

As a result, the range of play of steering wheel 2 can be determined as from $\theta_{LH\_AVG}$ to $\theta_{RH\_AVG}$.

Furthermore, steering control apparatus 30 can calculate the actual neutral point of the steering angle using following equation 3. The actual neutral point of the steering angle refers to an actual steering angle at a time when steering wheel 2 is at a neutral (central) position.

$$\theta_{CTR} = \frac{1}{2}(\theta_{LH\_AVG} + \theta_{RH\_AVG}) \quad (3)$$

As shown in equation 3, the neutral point of the steering angle is calculated as a median of play boundary values for a plurality of cycles.

When steering wheel 2 is at the neutral position, the steering angle should ideally be zero, but in practice, the steering angle might not be zero when steering wheel 2 is at the neutral position, depending on how steering shaft 3, pitman arm 5, link mechanism 6, and the like are engaged with one another. By calculating the actual neutral point of the steering angle through the calculation operations, therefore, steering control apparatus 30 can detect a deviation of the actual steering angle and correct the actual steering angle in accordance with the deviation during the control based on the following driving operation.

Figure 5:
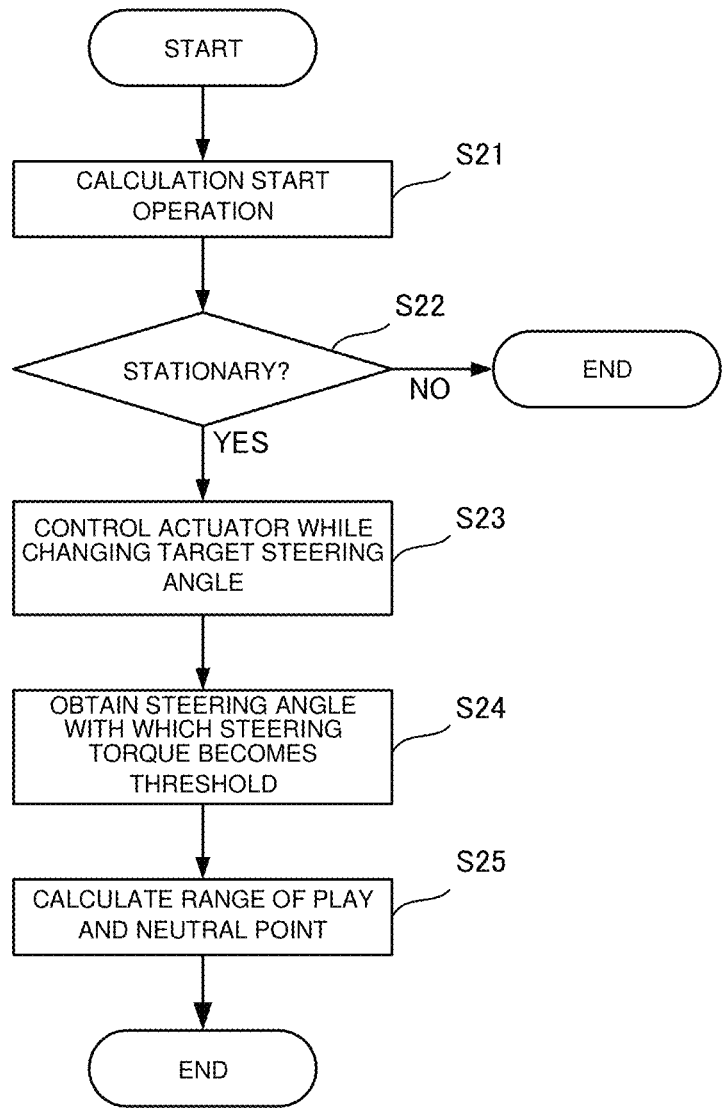
FIG. 5 is a flowchart illustrating an example of the calculation operations performed by the steering control apparatus.

FIG. 5 is a flowchart illustrating an example of the calculation operations of steering control apparatus 30.

In step S21, steering control apparatus 30 receives, for example, a starting operation for the calculation operations performed by the driver.

In step S22, steering control apparatus 30 checks whether vehicle 1 is stationary. In the present disclosure, when vehicle 1 is stationary, for example, a power source for vehicle 1 is stopped, that is, more specifically, an engine is off or a driving motor is off. If vehicle 1 is stationary, the process proceeds to step S23, and if vehicle 1 is not stationary, the calculation operations end.

In step S23, steering control apparatus 30 outputs, to steering actuator 12, a control signal in which the target steering angle is changed cyclically and continuously.

In step S24, steering control apparatus 30 obtains, for a plurality of cycles, a steering angle with which the absolute value of the steering torque applied to steering shaft 3 exceeds threshold $T_{TH}$ when steering actuator 12 changes the steering angle in accordance with the control signal in step S23 and stores the steering angles in storage section 33.

In step S25, steering control apparatus 30 calculates the range of play and the neutral point of the steering angle further on the basis of the stored steering angles for the plurality of cycles using equations 1 to 3. The calculated range of play and a value of the neutral point are stored in storage section 33 and read and used in the following driving operation to improve accuracy.

Actions and Effects

As described above, with steering control apparatus 30 according to the embodiment of the present disclosure, the range of play of steering wheel 2 can be determined and the actual neutral point of the steering angle can be calculated on the basis of the range of play while vehicle 1 is stationary. As a result, even if the actual neutral point of the steering angle is deviated from the neutral position of steering wheel 2, the deviation can be corrected during the lane-following driving operation, and a more accurate following driving operation can be performed.

Modifications

The above-described embodiment is an aspect of the present disclosure, and the present disclosure may be modified in various ways other than the above-described embodiment. Specific examples of modifications will be described hereinafter.

In the above-described embodiment, the calculation operations are performed when the driver performs the calculation start operation while vehicle 1 is stationary. The present disclosure, however, is not limited to this, and, for example, steering control apparatus 30 may automatically perform the calculation operations, instead.

When a vehicle key is set to on, brakes are applied, and the power source is stopped, for example, steering control apparatus 30 may automatically perform the calculation operations after notifying the driver of a start of the calculation operations. Alternatively, if the brakes are applied and the power source is stopped when a loading weight detection sensor (detection section) provided for vehicle 1 detects an increase or a decrease in loading weight, steering control apparatus 30 may automatically perform the calculation operations. When vehicle 1 is a large-sized vehicle such as a truck, how steering shaft 3, pitman arm 5, link mechanism 6, and the like are engaged with one another tends to change as the loading weight changes, and accordingly the range of play and the neutral point of the steering angle tend to change. This operation is more preferable because the range of play and the neutral point of the steering angle can be certainly recalculated when it is likely that the range of play and the neutral point of the steering angle have changed due to a change in the loading weight.

INDUSTRIAL APPLICABILITY

The present disclosure is effective in vehicles that drive while following a lane and the like.

The invention claimed is:
1. A vehicle comprising:
a steering actuator;
a detection sensor that detects a change in loading weight of the vehicle, and
a steering control apparatus, comprising a processor that is configured to:
control a steering actuator for changing a steering angle such that the steering angle achieves a target steering angle;
obtain threshold steering angle information regarding a threshold steering angle, the threshold steering angle being a steering angle with which a steering torque becomes a certain threshold when the target steering angle is varied cyclically and continuously, the certain threshold being an absolute value after the steering torque sharply changes; and
calculate a neutral point of the steering angle based on the threshold steering angle information,
wherein, in a case where the change in the loading weight of the vehicle is detected, the steering control apparatus automatically calculates the neutral point while the vehicle is stationary.
2. The vehicle according to claim 1,
wherein the processor is further configured to calculate the neutral point based on an average of the threshold steering angle at a time when the target steering angle is varied for a plurality of cycles.
3. The vehicle according to claim 2,
wherein the processor is further configured to calculate the average of the threshold steering angle in each of left and right directions of the steering angle and determine a range from the average of the threshold steering angle in the left direction to the average of the threshold steering angle in the right direction as a range of play of the steering angle and a central value of the range of play as the neutral point.

* * * * *